United States Patent
Inagaki et al.

(10) Patent No.: US 11,691,405 B2
(45) Date of Patent: Jul. 4, 2023

(54) LAYERED FILM PRODUCTION METHOD

(71) Applicant: NITTO DENKO CORPORATION, Ibaraki (JP)

(72) Inventors: Junichi Inagaki, Ibaraki (JP); Takeshi Murashige, Ibaraki (JP); Keisuke Sato, Ibaraki (JP); Toshihiro Kanno, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 59 days.

(21) Appl. No.: 17/442,824

(22) PCT Filed: Feb. 10, 2020

(86) PCT No.: PCT/JP2020/005148
§ 371 (c)(1),
(2) Date: Sep. 24, 2021

(87) PCT Pub. No.: WO2020/195251
PCT Pub. Date: Oct. 1, 2020

(65) Prior Publication Data
US 2022/0219440 A1    Jul. 14, 2022

(30) Foreign Application Priority Data
Mar. 26, 2019   (JP) .................. 2019-057851

(51) Int. Cl.
*B32B 37/12* (2006.01)
*B32B 17/10* (2006.01)
(Continued)

(52) U.S. Cl.
CPC ............ *B32B 37/12* (2013.01); *B32B 7/12* (2013.01); *B32B 17/10* (2013.01);
(Continued)

(58) Field of Classification Search
CPC ........ B32B 2307/42; B32B 2037/1253; B32B 2038/0076; G02B 5/3033; G02B 5/3041;
(Continued)

(56) References Cited

U.S. PATENT DOCUMENTS 5,943,113 A    8/1999 Ichihashi
8,525,405 B2 *  9/2013 Kuwabara .............. G02F 1/1333
                                                  313/506
(Continued)

FOREIGN PATENT DOCUMENTS

CN    102129134 A    7/2011
JP    2011-145534 A    7/2011
(Continued)

OTHER PUBLICATIONS

International Search Report dated Apr. 28, 2020, issued in counterpart application No. PCT/JP2020/005148 (2 pages).
(Continued)

*Primary Examiner* — Carson Gross
(74) *Attorney, Agent, or Firm* — WHDA, LLP (57) ABSTRACT

Provided is a method of manufacturing a laminated film, the method including laminating a glass film and a resin film via an adhesive layer, by which peeling between the glass film and the resin film is prevented, and hence a laminated film excellent in appearance can be obtained. The method of manufacturing a laminated film of the present invention includes the steps of: laminating a glass film and a resin film via an adhesive to provide a precursor laminate; and curing the adhesive by applying an active energy ray to the precursor laminate, wherein the curing step includes nonuniformly applying the active energy ray in a surface of the precursor laminate.

5 Claims, 3 Drawing Sheets

(51) Int. Cl.
  *B32B 7/12* (2006.01)
  *G02F 1/1335* (2006.01)
  *B32B 38/00* (2006.01)
  *B29C 65/48* (2006.01)
  *G02B 5/30* (2006.01)

(52) U.S. Cl.
  CPC ... *B29C 65/4845* (2013.01); *B32B 2037/1253* (2013.01); *B32B 2038/0076* (2013.01); *B32B 2307/42* (2013.01); *B32B 2307/732* (2013.01); *B32B 2310/0831* (2013.01); *G02B 5/305* (2013.01); *G02F 1/133528* (2013.01)

(58) Field of Classification Search
  CPC .............. G02B 5/305; G02F 1/133528; B29C 65/4845
  See application file for complete search history.

(56) References Cited

U.S. PATENT DOCUMENTS

| | | |
|---|---|---|
| 8,628,637 B2 | 1/2014 | Ishii et al. |
| 10,877,377 B2 | 12/2020 | Bilinsky |
| 2011/0177261 A1 | 7/2011 | Ishii et al. |
| 2015/0146294 A1* | 5/2015 | Watanabe ......... G02F 1/133528 156/229 |
| 2015/0230361 A1* | 8/2015 | Lo ........................ B32B 37/18 156/60 |
| 2018/0307138 A1 | 10/2018 | Bilinsky |

FOREIGN PATENT DOCUMENTS

| | | |
|---|---|---|
| JP | 2012-071281 A | 4/2012 |
| JP | 2018-531785 A | 11/2018 |
| WO | 2014/207867 A1 | 12/2014 |

OTHER PUBLICATIONS

Extended (Supplementary) European Search Report dated Nov. 23, 2022, issued in counterpart EP application No. 20778313.5. (8 pages).

Anonymous, "Ultraviolet, Wikipedia, the free encyclopedia", Jun. 12, 2017, pp. 1-28, XP055777270, URL:https://en.wikipedia.org/w/index.php?title=Ultraviolet&oldid=785222351, cited in EP Extended European Search Report dated Nov. 23, 2022. (28 pages).

Office Action dated Dec. 30, 2022, issued in counterpart to CN patent application No. 202080024002.8 with English translation. (15 pages).

* cited by examiner

LAYERED FILM PRODUCTION METHOD

TECHNICAL FIELD

The present invention relates to a method of manufacturing a laminated film.

BACKGROUND ART

In recent years, the weight reductions and thinning of display and lighting elements each using a liquid crystal display element or an organic EL, and of a solar cell have been advancing from the viewpoints of conveyability, storability, and a design property, and development toward continuous production by a roll-to-roll process has also been advancing. The use of extremely thin glass (hereinafter also referred to as "glass film") has been proposed as a method of imparting flexibility to glass to be used in those elements and the like. The glass film has flexibility and can be wound in a roll shape, and hence can be processed by the roll-to-roll process. There has heretofore been a disclosure of, for example, a method including laminating a resin film, such as a polarizing plate, on the glass film through use of the roll-to-roll process (e.g., Patent Literature 1).

CITATION LIST

Patent Literature

[PTL 1] U.S. Pat. No. 8,525,405 B2

SUMMARY OF INVENTION

Technical Problem

The glass film and the resin film may be laminated via an adhesive layer, and in consideration of, for example, production efficiency, an adhesive that can be cured with an active energy ray (e.g., UV light) may be preferably used. The inventors of the present invention have found a problem in that when such glass film and resin film are laminated, at the time of the curing of the adhesive, part of the resin film is not sufficiently brought into close contact with the glass film, and hence peels therefrom to frequently cause an appearance failure. Such problem does not occur at the time of, for example, the lamination of the resin films via the adhesive layer, and is a problem specific to a case in which the glass film is used. The problem is considered to be caused by a large difference in linear expansion coefficient between the glass film and the resin film.

The present invention has been made to solve the problem of the related art, and an object of the present invention is to provide a method of manufacturing a laminated film, the method including laminating a glass film and a resin film via an adhesive layer, by which peeling between the glass film and the resin film is prevented, and hence a laminated film excellent in appearance can be obtained.

Solution to Problem

According to one embodiment of the present invention, there is provided a method of manufacturing a laminated film, including the steps of: laminating a glass film and a resin film via an adhesive to provide a precursor laminate; and curing the adhesive by applying an active energy ray to the precursor laminate, wherein the curing step includes nonuniformly applying the active energy ray in a surface of the precursor laminate.

In one embodiment, the curing step includes applying the active energy ray so that an integrated light quantity in a widthwise direction of the precursor laminate becomes nonuniform.

In one embodiment, the curing step includes applying the active energy ray so that an integrated light quantity in a central portion in the widthwise direction of the precursor laminate becomes larger than an integrated light quantity in end portions in the widthwise direction of the precursor laminate.

In one embodiment, the curing step includes applying the active energy ray to a central portion in the widthwise direction of the precursor laminate, followed by application of the active energy ray to end portions in the widthwise direction of the precursor laminate and the central portion in the widthwise direction.

In one embodiment, in the curing step, end portions in the widthwise direction of the precursor laminate each have a maximum temperature of 60° C. or less.

In one embodiment, the curing step includes applying the active energy ray so that an integrated light quantity in a widthwise direction of the precursor laminate becomes substantially uniform.

In one embodiment, the resin film is a polarizing plate.

In one embodiment, the resin film has a width wider than that of the glass film, and a difference between the width of the resin film and the width of the glass film is from 10 mm to 100 mm.

Advantageous Effects of Invention

According to the present invention, the method of manufacturing a laminated film, the method including laminating a glass film and a resin film via an adhesive layer, by which peeling between the glass film and the resin film is prevented, and hence a laminated film excellent in appearance, can be provided.

DESCRIPTION OF EMBODIMENTS

A. Method of Manufacturing Laminated Film

Figure 1:
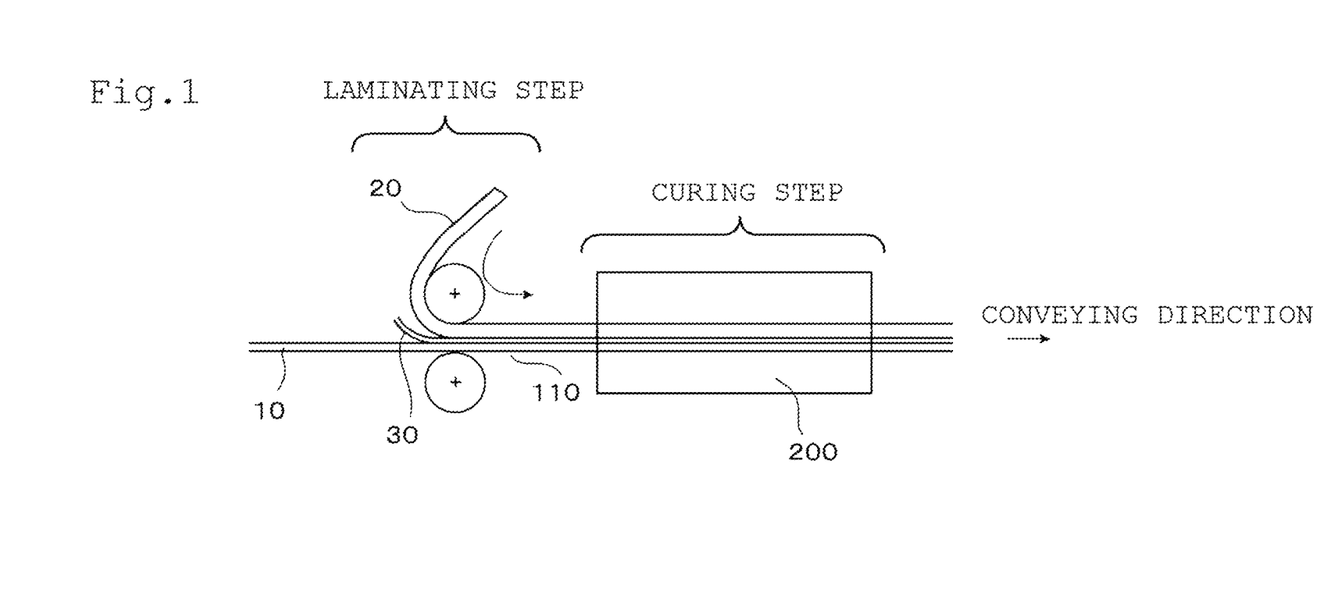
FIG. 1 is a schematic view for illustrating a method of manufacturing a laminated film according to one embodiment of the present invention.

FIG. 1 is a schematic view for illustrating a method of manufacturing a laminated film according to one embodiment of the present invention. The method of manufacturing a laminated film of the present invention includes the steps of: a glass film 10 and a resin film 20 via an adhesive 30 to provide a precursor laminate 110; and curing the adhesive by applying an active energy ray to the precursor laminate 110. After the curing step, the laminated film formed by laminating the glass film 10 and the resin film 20 via an adhesive layer can be obtained. In the curing step, the active energy ray is nonuniformly applied in the surface of the precursor laminate. The phrase "the active energy ray is nonuniformly applied" means that instead of applying the same quantity of the active energy ray to the precursor laminate in the entirety of a region where the adhesive is cured by applying the active energy ray (application region), the quantity of the active energy ray to be applied to the precursor laminate at a predetermined site in the application region is made smaller than that at any other site, or is set to zero. The active energy ray can be nonuniformly applied by, for example, reducing the irradiation quantities of part of a plurality of irradiation machines present in an irradiation furnace 200 or turning off part of the machines.

Typically, the glass film and the resin film are each of an elongated shape, and the laminating step and the curing step are performed by a roll-to-roll process while the respective films are conveyed. The term "elongated shape" as used herein means a slender shape whose length is sufficiently long as compared to its width, and includes, for example, a slender shape having a length 10 or more times, preferably 20 or more times as long as its width. The term "lengthwise direction" as used herein means the direction in which the films are conveyed, and the term "widthwise direction" as used herein means a direction perpendicular to the conveying direction.

In the present invention, the adhesive is cured by nonuniformly applying the active energy ray. Thus, excessive heating of the resin film and an abrupt change in temperature of the resin film are avoided, and hence peeling between the glass film and the resin film can be prevented. In particular, when the quantity of the active energy ray to be applied to end portions in the widthwise direction of the precursor laminate is made smaller than that to a central portion in the widthwise direction, a preventing effect on partial peeling of the resin film in the end portions in the widthwise direction resulting from the dimensional change of the resin film becomes significant. Thus, the occurrence of an appearance failure is suppressed, and hence a laminated film can be obtained in high yield. Details about the foregoing are described later.

The method of manufacturing a laminated film of the present invention may further include any appropriate other step.

A-1. Laminating Step

In the laminating step, the adhesive is applied to one surface of the glass film and/or the resin film, and the glass film and the resin film are laminated via the adhesive.

(Glass Film)

Any appropriate glass film may be adopted as the glass film. According to classification based on composition, examples of the glass film include soda-lime glass, borate glass, aluminosilicate glass, and quartz glass films. In addition, according to classification based on an alkali component, examples of the glass film include alkali-free glass and low-alkali glass films. The content of an alkali metal component (e.g., $Na_2O$, $K_2O$, $Li_2O$) in the glass is preferably 15 wt % or less, more preferably 10 wt % or less.

The thickness of the glass film is preferably from 10 μm to 150 μm, more preferably from 20 μm to 140 μm, still more preferably from 30 μm to 130 μm, particularly preferably from 40 μm to 120 μm.

The width of the glass film is preferably from 100 mm to 5,000 mm, more preferably from 200 mm to 3,000 mm, still more preferably from 300 mm to 2,000 mm.

The glass film preferably has a light transmittance at a wavelength of 550 nm of 85% or more. The glass film preferably has a refractive index at a wavelength of 550 nm of from 1.4 to 1.65.

The glass film has a density of preferably from 2.3 $g/cm^3$ to 3.0 $g/cm^3$, more preferably from 2.3 $g/cm^3$ to 2.7 $g/cm^3$.

Any appropriate method may be adopted as a forming method for the glass film. The glass film is typically produced by melting a mixture containing a main raw material, such as silica or alumina, a fining agent, such as salt cake or antimony oxide, and a reducing agent, such as carbon, at a temperature of from 1,400° C. to 1,600° C., and forming the molten mixture into a thin sheet shape, followed by cooling. Examples of the forming method for the glass film include a slot down-draw method, a fusion method, and a float method. The glass film formed in a sheet shape by any one of those methods may be chemically polished with a solvent, such as hydrofluoric acid, as required, in order to reduce its thickness or enhance its smoothness.

(Resin Film)

Any appropriate film may be used as the resin film in accordance with the applications of the laminated film. Examples of the resin film may include a polarizing plate, an optical film, a conductive film, and a light control film. The resin film may be formed of a single layer, or may be formed of a plurality of layers.

The width of the resin film is preferably from 110 mm to 5,000 mm, more preferably from 210 mm to 3,000 mm, still more preferably from 310 mm to 2,000 mm.

In one embodiment, the width of the resin film is wider than that of the glass film. A difference between the width of the resin film and the width of the glass film is preferably from 10 mm to 100 mm, more preferably from 20 mm to 70 mm. When the width of the resin film is made wider than the width of the glass film, a brittle end surface of the glass film can be protected. When an end portion of the resin film protrudes from the glass film as a result of the widening of the width of the resin film, in normal cases, the end portion of the resin film is liable to progress (particularly in its lengthwise direction), and hence the resin film is liable to peel from the glass film. According to the manufacturing method of the present invention, however, such peeling is prevented, and hence a laminated film excellent in appearance can be obtained.

The linear expansion coefficient of the resin film is preferably from 1 ppm/° C. to 150 ppm/° C., more preferably from 5 ppm/° C. to 100 ppm/° C. The linear expansion coefficient may be measured with a thermomechanical analyzer (TMA). In the present invention, even when the resin film having a linear expansion coefficient much larger than that of the glass film, that is, the resin film showing such a tendency that a dimensional difference between itself and the glass film becomes larger along with the progress of its heating, and the glass film are laminated, the peeling of the resin film can be prevented.

A polarizing plate is described below as a typical example of the resin film.

The polarizing plate includes a polarizer. The thickness of the polarizer is not particularly limited, and an appropriate thickness may be adopted depending on purposes. The thickness is typically from about 1 μm to about 80 μm. In one embodiment, a thin polarizer is used, and the thickness of the polarizer is preferably 20 μm or less, more preferably 15 μm or less, still more preferably 10 μm or less, particularly preferably 6 μm or less.

The polarizer preferably exhibits absorption dichroism at any wavelength in the wavelength range of from 380 nm to 780 nm. The polarizer has a single layer transmittance of preferably 40.0% or more, more preferably 41.0% or more, still more preferably 42.0% or more, particularly preferably 43.0% or more. The polarizer has a polarization degree of preferably 99.8% or more, more preferably 99.9% or more, still more preferably 99.95% or more.

The polarizer is preferably an iodine-based polarizer. More specifically, the polarizer may be formed of an iodine-containing polyvinyl alcohol-based resin (hereinafter referred to as "PVA-based resin") film.

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizer excellent in durability. When the saponification degree is excessively high, gelling may occur.

The average polymerization degree of the PVA-based resin may be appropriately selected depending on purposes. The average polymerization degree is typically from 1,000 to 10,000, preferably from 1,200 to 5,000, more preferably from 1,500 to 4,500. The average polymerization degree may be determined in conformity with JIS K 6726-1994.

A production method for the polarizer is, for example, a method (I) including stretching and dyeing a PVA-based resin film alone, or a method (II) including stretching and dyeing a laminate (i) having a resin substrate and a polyvinyl alcohol-based resin layer. Detailed description of the method (I) is omitted because the method is well known and commonly used in the art. The production method (II) preferably includes the step of stretching and dyeing the laminate (i) having the resin substrate and the polyvinyl alcohol-based resin layer formed on one side of the resin substrate to produce a polarizer on the resin substrate. The laminate (i) may be formed by applying an application liquid containing a polyvinyl alcohol-based resin onto the resin substrate and drying the applied liquid. In addition, the laminate (i) may be formed by transferring a polyvinyl alcohol-based resin film onto the resin substrate. For example, the details of the production method (II) are described in JP 2012-73580 A, which is incorporated herein by reference.

In one embodiment, the polarizing plate includes a protective film arranged on at least one side of the polarizer. Any appropriate resin film may be adopted as the protective film. As a material for forming the protective film, there are given, for example: a polyester-based resin, such as polyethylene terephthalate (PET); a cellulose-based resin, such as triacetylcellulose (TAC); a cycloolefin-based resin, such as a norbornene-based resin; an olefin-based resin, such as polyethylene or polypropylene; and a (meth)acrylic resin. Of those, polyethylene terephthalate (PET) is preferred. The term "(meth)acrylic resin" refers to an acrylic resin and/or a methacrylic resin.

In one embodiment, a (meth)acrylic resin having a glutarimide structure is used as the (meth)acrylic resin. The (meth)acrylic resin having a glutarimide structure (hereinafter sometimes referred to as glutarimide resin) is described in, for example, JP 2006-309033 A, JP 2006-317560 A, JP 2006-328329 A, 2006-328334 A, JP 2006-337491 A, JP 2006-337492 A, JP 2006-337493 A, JP 2006-337569 A, JP 2007-009182 A, JP 2009-161744 A, and JP 2010-284840 A, the descriptions of which are incorporated herein by reference.

The protective film and the polarizer are laminated via any appropriate adhesive layer. The resin substrate used at the time of the production of the polarizer may be peeled before the lamination of the protective film and the polarizer, or after the lamination.

The thickness of the protective film is preferably from 4 µm to 250 µm, more preferably from 5 µm to 150 µm, still more preferably from 10 µm to 100 µm, particularly preferably from 10 µm to 50 µm.

The modulus of elasticity of the protective film is preferably from 1 GPa to 10 GPa, more preferably from 2 GPa to 7 GPa, still more preferably from 2 GPa to 5 GPa. When the modulus of elasticity falls within such ranges, a resin film excellent in puncture resistance can be obtained.

(Adhesive)

Any appropriate adhesive that is curable with an active energy ray (e.g., UV light) may be used as the adhesive. Examples of the adhesive include an epoxy-based adhesive, a rubber-based adhesive, an acrylic adhesive, a silicone-based adhesive, a urethane-based adhesive, and mixtures thereof. Of those, an epoxy-based adhesive is preferred. The epoxy-based adhesive is suitable as the adhesive to be used in the present invention because the adhesive hardly cures and shrinks. Meanwhile, a long time period is required for the curing of the epoxy-based adhesive, and hence the adhesive tends to be exposed to irradiation with the active energy ray over a long time period. The long-term irradiation with the active energy ray may be a cause for the progress of the resin film, that is, a cause for the peeling of the resin film. According to the present invention, however, even when the epoxy-based adhesive whose curing requires a long time period is used, the peeling of the resin film from the glass film is prevented, and hence a laminated film excellent in appearance can be obtained. The adhesive may be in a solution state, or may be in a sheet state.

Examples of a method of applying the adhesive include: coating methods, such as air doctor coating, blade coating, knife coating, reverse coating, transfer roll coating, gravure roll coating, kiss coating, cast coating, spray coating, slot orifice coating, calendar coating, electrodeposition coating, dip coating, and die coating; and printing methods including a letterpress printing method, such as flexographic printing, an intaglio printing method, such as a direct gravure printing method or an offset gravure printing method, a lithographic printing method, such as an offset printing method, and a stencil printing method, such as a screen printing method.

The adhesive is preferably applied so that its thickness after curing becomes from 0.1 µm to 15 µm, and is more preferably applied so that the thickness after curing becomes from 0.5 µm to 10 µm.

Any appropriate method may be adopted as a method of laminating the glass film and the resin film via the adhesive. The lamination method is, for example, a method including applying the adhesive to a resin film side through use of gravure roll coating, and then laminating the resin film and the glass film.

A-2. Curing Step

As described above, in the curing step, the adhesive is cured by applying the active energy ray to the precursor laminate. For example, the application of the active energy ray may be performed in an irradiation furnace having a predetermined length with a plurality of active energy ray irradiation machines arranged in the irradiation furnace.

FIG. 2(a) to FIG. 2(d) are schematic plan views for illustrating examples of the curing step in one embodiment of the present invention. In each of FIGS. 2, an irradiation portion 210 (e.g., a portion where an irradiation machine is operated) in the application region 200 (e.g., an irradiation furnace) is illustrated while being colored. In addition, in each of FIG. 2(b) and FIG. 2(c), whether an active energy ray irradiation quantity is large or small is represented by the light and shade of the coloring, and a heavily colored region means a region where the active energy ray irradiation quantity is large, while a lightly colored region means a region where the irradiation quantity is small. In the embodiment illustrated in each of FIG. 2, the active energy ray is applied so that an integrated light quantity in the widthwise direction of the precursor laminate 110 becomes nonuniform. The active energy ray is preferably applied so that an integrated light quantity in the central portion in the widthwise direction of the precursor laminate becomes larger than an integrated light quantity in the end portions in the widthwise direction. With such configuration, in the end portions in the widthwise direction where the resin film is liable to peel, the occurrence of the peeling can be significantly suppressed.

Figure 2A:
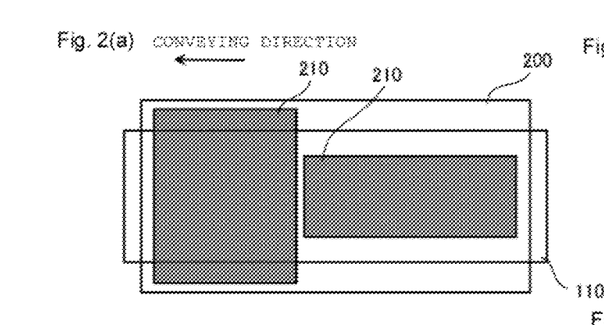
FIG. 2(a) to FIG. 2(d) are schematic plan views for illustrating examples of a curing step in one embodiment of the present invention.

As one example of a method of applying the active energy ray so that the integrated light quantity in the widthwise direction becomes nonuniform, there is given the following method: as illustrated in FIG. 2(a), the active energy ray is applied only to the central portion in the widthwise direction of the precursor laminate 110 in part of the application region, and the active energy ray is applied to an entire region in the widthwise direction of the precursor laminate 110 (i.e., the central portion in the widthwise direction and the end portions in the widthwise direction) in the remaining part thereof. Herein, the central portion in the widthwise direction of the precursor laminate is a portion including a center in the widthwise direction of the precursor laminate, and is, for example, a portion having a width corresponding to from 20% to 90% (preferably from 50% to 80%) of the width of the precursor laminate. The end portions in the widthwise direction are portions except the central portion. The width of the end portion present on the right side with respect to the direction in which the precursor laminate advances, and the width of the end portion present on the left side with respect thereto may be identical to or different from each other. A ratio (right-side end portion/left-side end portion) between the widths of both the end portions in the widthwise direction is preferably from ¼ to 4, more preferably from ½ to 2, still more preferably from 1/1.5 to 1.5, particularly preferably from 1/1.2 to 1.2.

Figure 2B:
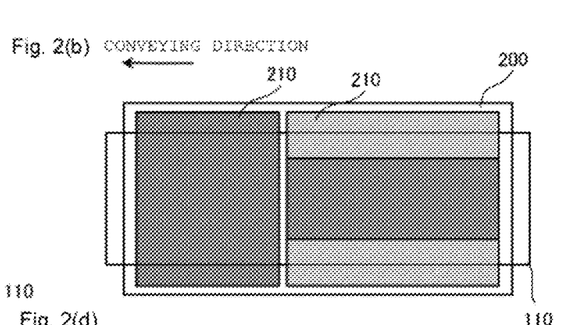
Figure 2C:
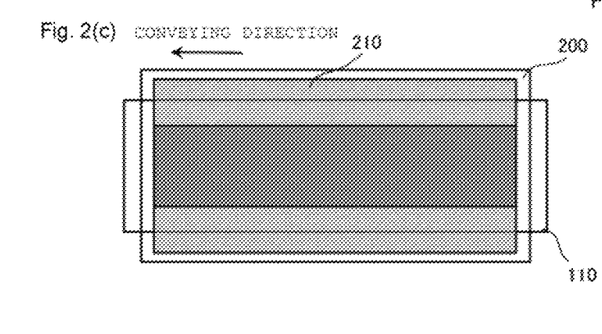

As another example of the method of applying the active energy ray so that the integrated light quantity in the widthwise direction becomes nonuniform, there is given the following method: as illustrated in FIG. 2(b), the intensity of the application of the active energy ray is changed from the center in the widthwise direction of the precursor laminate 110 toward an end side in the widthwise direction in part of the application region, and the active energy ray is applied to the entire region in the widthwise direction of the precursor laminate 110 (i.e., the central portion in the widthwise direction and the end portions in the widthwise direction) in the remaining part thereof. In addition, as still another example thereof, there is given the following method: as illustrated in FIG. 2(c), the intensity of the application of the active energy ray is changed from the center in the widthwise direction of the precursor laminate 110 toward an end side in the widthwise direction in the entirety of the application region. When the intensity of the application of the active energy ray is changed from the center in the widthwise direction of the precursor laminate 110 toward an end side in the widthwise direction, the intensity of the application of the active energy ray may be set in a stepwise manner, or may be set in a stepless manner.

Figure 2D:
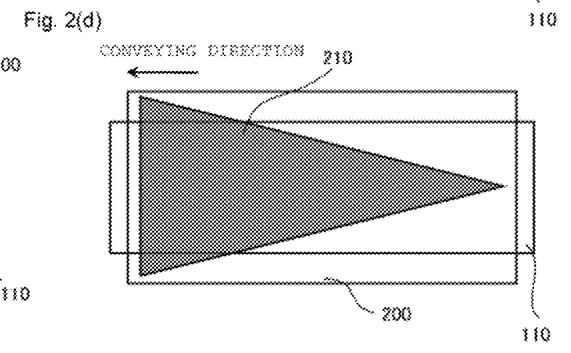

As still another example of the method of applying the active energy ray so that the integrated light quantity in the widthwise direction becomes nonuniform, there is given the following method: as illustrated in FIG. 2(d), the irradiation portion 210 is set to be of a substantially triangular shape. The application method is not limited to the embodiments illustrated in FIG. 2(a) to FIG. 2(d), and any appropriate application method may be adopted as long as the active energy ray is applied so that the integrated light quantity becomes nonuniform (preferably so that the integrated light quantity in the central portion in the widthwise direction of the precursor laminate becomes larger than the integrated light quantity in the end portions in the widthwise direction).

When the active energy ray is applied so that the integrated light quantity in the widthwise direction becomes nonuniform, the integrated light quantity in the central portion in the widthwise direction is preferably from 100 mJ/cm² to 3,000 mJ/cm², more preferably from 200 mJ/cm² to 2,500 mJ/cm², still more preferably from 300 mJ/cm² to 2,000 mJ/cm². The integrated light quantity in the end portions in the widthwise direction is preferably from 25 mJ/cm² to 2,700 mJ/cm², more preferably from 50 mJ/cm² to 2,300 mJ/cm², still more preferably from 75 mJ/cm² to 1,800 mJ/cm². In addition, the integrated light quantity in the center in the widthwise direction is preferably from 1.1 times to 4 times, more preferably from 1.2 times to 3 times as large as the integrated light quantity in the end sides in the widthwise direction. When the former integrated light quantity falls within such ranges, in the end portions in the widthwise direction where the resin film is liable to peel, the occurrence of the peeling can be significantly suppressed.

In addition, when the active energy ray (e.g., UV light) is applied so that the integrated light quantity in the widthwise direction becomes nonuniform, the active energy ray is preferably applied to the end portions in the widthwise direction of the precursor laminate and the central portion in the widthwise direction after the active energy ray has been applied to the central portion in the widthwise direction. When the central portion in the widthwise direction is cured in advance, the peeling of the resin film can be effectively suppressed. In addition, even if the peeling of the resin film occurs in any one of the end portions in the widthwise direction, the range of the peeling can be kept narrow.

In one embodiment, the irradiation quantity of the active energy ray is adjusted with respect to the surface temperature of the precursor laminate. In the curing step, the surface temperature of the central portion in the widthwise direction of the precursor laminate is preferably from 25° C. to 80° C., more preferably from 30° C. to 70° C. In the curing step, the surface temperature of each of the end portions in the widthwise direction of the precursor laminate is preferably 60° C. or less, more preferably from 20° C. to 50° C., still more preferably from 25° C. to 40° C. In addition, in the curing step, the surface temperature of the central portion in the widthwise direction is preferably from 1.1 times to 3.5 times, more preferably from 1.2 times to 3 times as high as the surface temperature of each of the end portions in the widthwise direction. Herein, the surface temperature of the precursor laminate is a surface temperature on the side to which the active energy ray is applied.

Figure 3A:
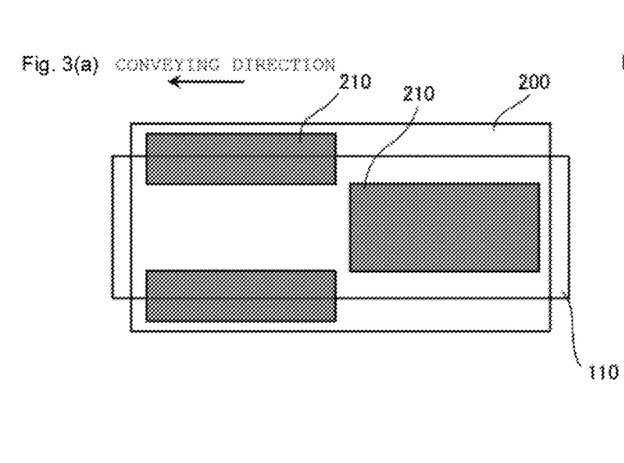
FIG. 3(a) and FIG. 3(b) are schematic plan views for illustrating examples of a curing step in another embodiment of the present invention.
Figure 3B:
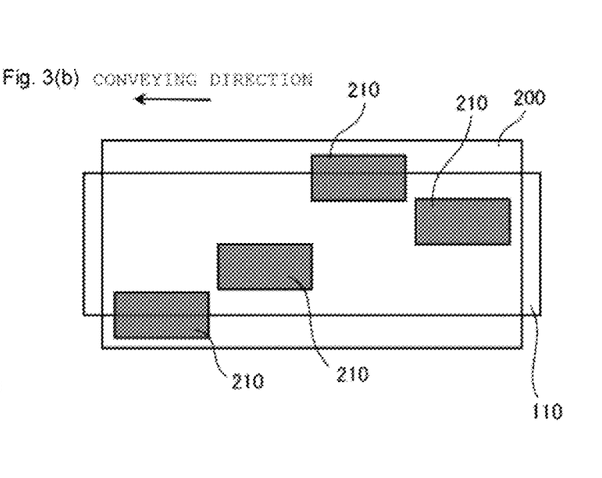

FIG. 3(a) and FIG. 3(b) are schematic plan views for illustrating examples of the curing step in another embodiment of the present invention. In each of FIG. 3, the irradiation portion 210 (e.g., a portion where an irradiation machine is operated) in the application region 200 (e.g., an irradiation furnace) is illustrated while being colored. In the embodiment illustrated in each of FIG. 3, the active energy ray is applied so that an integrated light quantity in the widthwise direction of the precursor laminate becomes substantially uniform. When the active energy ray is applied so that the integrated light quantity becomes substantially uniform, the active energy ray is preferably applied to the end portions in the widthwise direction of the precursor laminate after the active energy ray has been applied to the central portion in the widthwise direction. When the central portion in the widthwise direction is cured in advance, the peeling of the resin film can be effectively suppressed. In addition, even if the peeling of the resin film occurs in any one of the end portions in the widthwise direction, the range of the peeling can be kept narrow. The active energy ray may be applied to each of the left side and right side of the precursor laminate separately. That is, the following may be performed: as illustrated in FIG. 3(b), in the left half or right half of the precursor laminate, the active energy ray is applied to the central portion in the widthwise direction of the precursor laminate, and then the active energy ray is applied to an end portion in the widthwise direction; and next, in the remaining half thereof, the active energy ray is applied to the central portion in the widthwise direction of the precursor laminate, and then the active energy ray is applied to an end portion in the widthwise direction. The application method is not limited to the embodiments illustrated in FIG. 3(a) and FIG. 3(b), and any appropriate application method may be adopted as long as the active energy ray is applied so that the integrated light quantity becomes uniform (preferably so that the active energy ray is applied to the end portions in the widthwise direction of the precursor laminate after the active energy ray has been applied to the central portion in the widthwise direction).

When the active energy ray (e.g., UV light) is applied so that the integrated light quantity becomes substantially uniform, the integrated light quantity for the precursor laminate is preferably from 100 mJ/cm$^2$ to 3,000 mJ/cm$^2$, more preferably from 200 mJ/cm$^2$ to 2,500 mJ/cm$^2$, still more preferably from 300 mJ/cm$^2$ to 2,000 mJ/cm$^2$. A state in which the integrated light quantity is substantially uniform means that a variation in integrated light quantity in the surface of the precursor laminate is an average ±20%.

The length of the region where the adhesive is cured by applying the active energy ray (application region) is preferably from 0.5 m to 20 m, more preferably from 1 m to 10 m. In addition, a conveyance speed (line speed) in the curing step is preferably from 2 m/min to 50 m/min, more preferably from 3 m/min to 30 m/min, still more preferably from 5 m/min to 20 m/min. When the conveyance speed falls within such ranges, it becomes easier to adjust the irradiation quantity of the active energy ray.

EXAMPLES

The present invention is specifically described below by way of Examples, but the present invention is not limited to these Examples.

Production Example 1

(Preparation of Adhesive)

An epoxy-based resin (manufactured by Daicel Chemical Industries, Ltd., product name: "CELLOXIDE 2021P"), another epoxy-based resin (manufactured by Daicel Chemical Industries, Ltd., product name: "EHPE 3150"), an oxetane-based resin (manufactured by Toagosei Co., Ltd., product name: "ARON OXETANE OXT-221"), an epoxy group-terminated coupling agent (manufactured by Shin-Etsu Chemical Co., Ltd., product name: "KBM-403"), and a polymerization initiator (CPI-101A manufactured by San-Apro Ltd.) were mixed at a ratio of 60:10:20:4:2 (weight basis) to prepare a UV-curable adhesive.

Example 1

(Preparation of UV Irradiation Machine)

60 (6 in a widthwise direction by 10 in a lengthwise direction) UV irradiation machines (manufactured by Ushio Inc., product name: "UniJet E110Z HD U365-453") were arranged so as to be capable of applying UV light in a range measuring 500 mm wide by 1,000 mm long. The UV irradiation machines were arranged so that a distance between each of the machines and an irradiated body (precursor laminate) became 50 mm.

(Production of Laminated Film)

The adhesive was applied to a polarizing plate film having a width of 500 mm (manufactured by Nitto Denko Corporation, product name: "NPF TEG1425DU") by gravure roll coating so as to have a thickness of 1 μm. After that, the film was bonded to a glass film having a width of 450 mm (manufactured by Nippon Electric Glass Co., Ltd., product name: "OA-10G," thickness: 100 μm) to form a precursor laminate.

Next, in a furnace having arranged therein the UV irradiation machines, the precursor laminate was conveyed (line speed: 5 m/min) so that the UV light was applied from its glass film surface side, followed by the curing of the adhesive. Thus, a laminated film was obtained. At this time, like the application method illustrated in FIG. 2(a), part of the UV irradiation machines positioned at sites corresponding to end portions in the widthwise direction of the precursor laminate were turned off so that the quantity of the UV light to be applied to a central portion (width: 350 mm) in the widthwise direction of the precursor laminate became larger than the quantity of the UV light to be applied to the other portions (end portions in the widthwise direction). Specifically, the quantity (integrated light quantity) of the UV light to be applied to the central portion (width: 350 mm) in the widthwise direction of the precursor laminate was 1,151 mJ/cm$^2$, and the UV light was applied to the other portions (end portions in the widthwise direction) so that an integrated light quantity became 487 mJ/cm$^2$. In addition, the surface temperature of the laminated film at the time of the UV application (position ahead of the starting point of the UV application by 300 mm) was measured with a product available under the product name "SURFACE THERMO TP-500HT" from ThermoPORT. As a result, the temperature of the central portion in the widthwise direction of the laminated film was 69° C., and the temperature of each of the vicinities of the end portions in the widthwise direction was 27° C.

(Evaluation)

As described above, the laminated film having a length of 100 m was continuously obtained. The number of sites at which the peeling (interfacial peeling between the glass film and the polarizing plate) of the resultant laminated film occurred was visually observed. As a result, no peeling was observed in the laminated film.

Example 2

A laminated film was obtained in the same manner as in Example 1 except that like the application method illustrated in FIG. 2(b), the output of each of part of the UV irradiation machines positioned at the sites corresponding to the end portions in the widthwise direction of the precursor laminate was set to one half of the output of each of the UV irradiation machines positioned at sites corresponding to the central portion in the widthwise direction. The quantity (integrated light quantity) of the UV light to be applied to the central portion (width: 350 mm) in the widthwise direction of the precursor laminate was 1,113 mJ/cm$^2$, and the UV light was applied to the other portions (end portions in the widthwise direction) so that an integrated light quantity became 731 mJ/cm$^2$. In addition, the surface temperature of the laminated film at the time of the UV application (position ahead of the starting point of the UV application by 300 mm) was measured with a product available under the product name "SURFACE THERMO TP-500HT" from ThermoPORT. As a result, the temperature of the central portion in the widthwise direction of the laminated film was 72° C., and the temperature of each of the vicinities of the end portions in the widthwise direction was 43° C.

The resultant laminated film was subjected to the same evaluation as that of Example 1. As a result, peeling was observed at 2 sites in the end portions in the widthwise direction of the laminated film.

Example 3

A laminated film was obtained in the same manner as in Example 1 except that like the application method illustrated in FIG. 2(c), the output of each of the UV irradiation machines positioned at the sites corresponding to the end portions in the widthwise direction of the precursor laminate was set to one half of the output of each of the UV irradiation machines positioned at sites corresponding to the central portion in the widthwise direction. The quantity (integrated light quantity) of the UV light to be applied to the central portion (width: 350 mm) in the widthwise direction of the precursor laminate was 1,051 mJ/cm$^2$, and the UV light was applied to the other portions (end portions in the widthwise direction) so that an integrated light quantity became 512 mJ/cm$^2$. In addition, the surface temperature of the laminated film at the time of the UV application (position ahead of the starting point of the UV application by 300 mm) was measured with a product available under the product name "SURFACE THERMO TP-500HT" from ThermoPORT. As a result, the temperature of the central portion in the widthwise direction of the laminated film was 72° C., and the temperature of each of the vicinities of the end portions in the widthwise direction was 43° C.

The resultant laminated film was subjected to the same evaluation as that of Example 1. As a result, peeling was observed at 1 site in the end portions in the widthwise direction of the laminated film.

Example 4

A laminated film was obtained in the same manner as in Example 1 except that like the application method illustrated in FIG. 2(d), part of the UV irradiation machines positioned at the sites corresponding to the end portions in the widthwise direction of the precursor laminate were turned off, and an application range in the widthwise direction was configured to gradually increase along with the traveling of the precursor. The quantity (integrated light quantity) of the UV light to be applied to the central portion (width: 350 mm) in the widthwise direction of the precursor laminate was 1,087 mJ/cm$^2$, and the UV light was applied to the other portions (end portions in the widthwise direction) so that an integrated light quantity became 331 mJ/cm$^2$. In addition, the surface temperature of the laminated film at the time of the UV application (position ahead of the starting point of the UV application by 300 mm) was measured with a product available under the product name "SURFACE THERMO TP-500HT" from ThermoPORT. As a result, the temperature of the central portion in the widthwise direction of the laminated film was 73° C., and the temperature of each of the vicinities of the end portions in the widthwise direction was 24° C.

The resultant laminated film was subjected to the same evaluation as that of Example 1. As a result, no peeling was observed in the laminated film.

Comparative Example 1

A laminated film was obtained in the same manner as in Example 1 except that: the outputs of all the UV irradiation machines were set to be equal to each other; the quantity (integrated light quantity) of the UV light to be applied to the central portion (width: 350 mm) in the widthwise direction of the precursor laminate was set to 1,089 mJ/cm$^2$; and the UV light was applied to the other portions (end portions in the widthwise direction) so that an integrated light quantity became 1,051 mJ/cm$^2$. The surface temperature of the laminated film at the time of the UV application (position ahead of the starting point of the UV application by 300 mm) was measured with a product available under the product name "SURFACE THERMO TP-500HT" from ThermoPORT. As a result, the temperature of the central portion in the widthwise direction of the laminated film was 73° C., and the temperature of each of the vicinities of the end portions in the widthwise direction was 74° C.

The resultant laminated film was subjected to the same evaluation as that of Example 1. As a result, peeling in the end portions in the widthwise direction of the laminated film was observed at 5 sites, and 13 sites at which the peeling occurred over an entire region in the widthwise direction were observed.

TABLE 1

| | UV integrated irradiation quantity | | | Surface temperature | | | Number of peeling sites | |
|---|---|---|---|---|---|---|---|---|
| | Central | End | | | | | Partial | |
| | portion in widthwise direction (mJ/cm$^2$) | portions in widthwise direction (mJ/cm$^2$) | Central portion/ end portions | Central portion in widthwise direction (° C.) | End portions in widthwise direction (° C.) | Central portion/ end portions | peeling in end portions in widthwise direction | Entire peeling in widthwise direction |
| Example 1 | 1,151 | 487 | 2.4 | 69 | 27 | 2.6 | 0 | 0 |
| Example 2 | 1,113 | 731 | 1.5 | 72 | 43 | 1.7 | 2 | 0 |
| Example 3 | 1,051 | 512 | 2.1 | 72 | 43 | 1.7 | 1 | 0 |

TABLE 1-continued

| | UV integrated irradiation quantity | | | Surface temperature | | | Number of peeling sites | |
| --- | --- | --- | --- | --- | --- | --- | --- | --- |
| | Central | End | | | | | Partial | |
| | portion in widthwise direction (mJ/cm²) | portions in widthwise direction (mJ/cm²) | Central portion/ end portions | Central portion in widthwise direction (° C.) | End portions in widthwise direction (° C.) | Central portion/ end portions | peeling in end portions in widthwise direction | Entire peeling in widthwise direction |
| Example 4 | 1,087 | 331 | 3.3 | 73 | 24 | 3.0 | 0 | 0 |
| Comparative Example 1 | 1,086 | 1,051 | 1.0 | 73 | 74 | 1.0 | 5 | 13 |

REFERENCE SIGNS LIST

10 glass film
20 resin film
30 adhesive
110 precursor laminate

The invention claimed is:

1. A method of manufacturing a laminated film, comprising the steps of:
laminating a glass film and a resin film via an adhesive to provide a precursor laminate; and
curing the adhesive by applying an active energy ray to the precursor laminate,
wherein the curing step includes nonuniformly applying the active energy ray in a surface of the precursor laminate;
wherein the curing step includes applying the active energy ray so that an integrated light quantity in a widthwise direction of the precursor laminate becomes nonuniform; and
wherein the curing step includes applying the active energy ray so that an integrated light quantity in a central portion in the widthwise direction of the precursor laminate becomes larger than an integrated light quantity in end portions in the widthwise direction of the precursor laminate.

2. The method of manufacturing a laminated film according to claim 1, wherein the curing step includes applying the active energy ray to a central portion in the widthwise direction of the precursor laminate, followed by application of the active energy ray to end portions in the widthwise direction of the precursor laminate and the central portion in the widthwise direction.

3. The method of manufacturing a laminated film according to claim 1, wherein in the curing step, end portions in the widthwise direction of the precursor laminate each have a maximum temperature of 60'C. or less.

4. The method of manufacturing a laminated film according to claim 1, wherein the resin film is a polarizing plate.

5. The method of manufacturing a laminated film according to claim 1,
wherein the resin film has a width wider than that of the glass film, and
wherein a difference between the width of the resin film and the width of the glass film is from 10 mm to 100 mm.

* * * * *